United States Patent [19]
Snowball

[11] Patent Number: 5,565,095
[45] Date of Patent: Oct. 15, 1996

[54] FILTER APPARATUS

[75] Inventor: Malcolm R. Snowball, Epping, England

[73] Assignee: Water Recovery PLC, Gwent, Wales

[21] Appl. No.: 350,522

[22] Filed: Dec. 7, 1994

[30] Foreign Application Priority Data

Dec. 11, 1993 [GB] United Kingdom ............... 9325391

[51] Int. Cl.⁶ ............................................. B01D 33/74
[52] U.S. Cl. .................. 210/116; 210/360.1; 210/512.1; 210/512.3
[58] Field of Search .................. 96/171, 216; 210/104, 210/304, 305, 306, 359, 360.1, 368, 402, 512.1, 512.3, 116, 369; 55/459.1

[56] References Cited

U.S. PATENT DOCUMENTS

| | | | |
|---|---|---|---|
| 1,098,927 | 6/1914 | Ward . | |
| 1,262,146 | 4/1918 | Ward | 210/512.1 |
| 2,442,234 | 5/1948 | Dunmire | 210/360.1 |
| 2,596,384 | 5/1952 | Dunmire | 210/360.1 |
| 2,670,849 | 3/1954 | Dunmire | 210/306 |
| 3,067,876 | 12/1962 | Hruby | 210/512.1 |
| 3,693,325 | 9/1972 | Muller | 96/177 |
| 4,447,322 | 5/1984 | Zajdlik | 210/104 |
| 5,376,268 | 12/1994 | Ikeda | 210/304 |

FOREIGN PATENT DOCUMENTS 1137974 12/1968 United Kingdom .
9206764 4/1992 WIPO .

*Primary Examiner*—Joseph W. Drodge
*Attorney, Agent, or Firm*—Roylance, Abrams, Berdo & Goodman, L.L.P.

[57] ABSTRACT

Filter apparatus for filtering liquids comprising a hollow filter body (12) mounted in a housing (18) having an inlet port (22) for supplying liquid to be filtered to the interior of the housing. An outlet port (24) for filtered liquid communicates with the interior of the filter body. A motor (16) is arranged to rotate the filter body around a vertical axis and paddles on the filter body cause liquid to be filtered to flow in a direction around the axis. In operation, at least some of the matter, such as particulate matter held in suspension or carried by the liquid which is heavier than the liquid, is caused to be directed outwardly in a direction from said filter body towards said housing. This matter would also be downwardly directed towards the bottom of the housing.

26 Claims, 3 Drawing Sheets

FILTER APPARATUS

FIELD OF THE INVENTION

This invention relates to filter apparatus and concerns apparatus suitable for filtering liquids.

SUMMARY OF THE INVENTION

According to the invention there is provided filter apparatus comprising
a hollow filter body mounted in a housing,
inlet means for supplying liquid to be filtered to the interior of the housing,
filtered liquid outlet means communicating with the interior of the filter body, and
means for causing liquid to be filtered to flow in a direction around an axis having a substantial vertical component passing through said filter body.

Thus in operation, at least some of the matter, such as particulate matter held in suspension or carried by the liquid, which is heavier than the liquid, is caused to be directed outwardly in a direction from said filter body towards said housing. This matter would also be downwardly directed towards the bottom of the housing.

The rate of flow of the liquid to be filtered around the axis is preferably such that a substantial proportion of said matter does not contact the filter body before being directed towards the housing, thus reducing the likelihood of the filter material becoming clogged.

In a preferred embodiment the filter body is fixedly mounted on a shaft rotatable about said axis and means, such as an electric motor, is provided for rotating said shaft. In such an embodiment said means for causing liquid flow may comprise paddle means on said filter body. The motor is preferably arranged to rotate the filter body at high speed, typically 2000 r.p.m. to 8000 r.p.m.

The filter body is preferably a right-circular cylinder.

The paddle means may comprise at least one elongate member on the external surface of the filter body. Preferably, a plurality of said paddle members are arranged in spaced parallel relation around said filter body and parallel to said axis.

At least one rib member may be so arranged on the internal wall of said housing so that the rib member in combination with the paddle means imparts a downward component force on the liquid to be filtered. Preferably a plurality of rib members are arranged around said housing in spaced parallel relationship.

The internal wall of the housing may be inclined outwardly in the direction towards its lower end and may be coated with P.T.F.E. or other suitable low friction material to facilitate easier downward movement of the separated matter.

Means may be provided for substantially reducing the rate of flow of said filtered liquid within said filter body in the direction around said axis, i.e. it stops the water inside the filter from spinning around the axis.

The means for substantially reducing said rate of flow may be at least one stator member mounted within said filter body. The or each stator member may be a planar member directed radially outwardly of said axis. Preferably a plurality of said stator members are provided and arranged substantially symmetrically around said axis. Preferably the or each stator member extends substantially the full internal length of the filter body.

BRIEF DESCRIPTION OF THE DRAWINGS

The invention will now be described by way of example with reference to the accompanying drawings, in which.

DETAILED DESCRIPTION OF THE PREFERRED EMBODIMENTS

Figure 1:
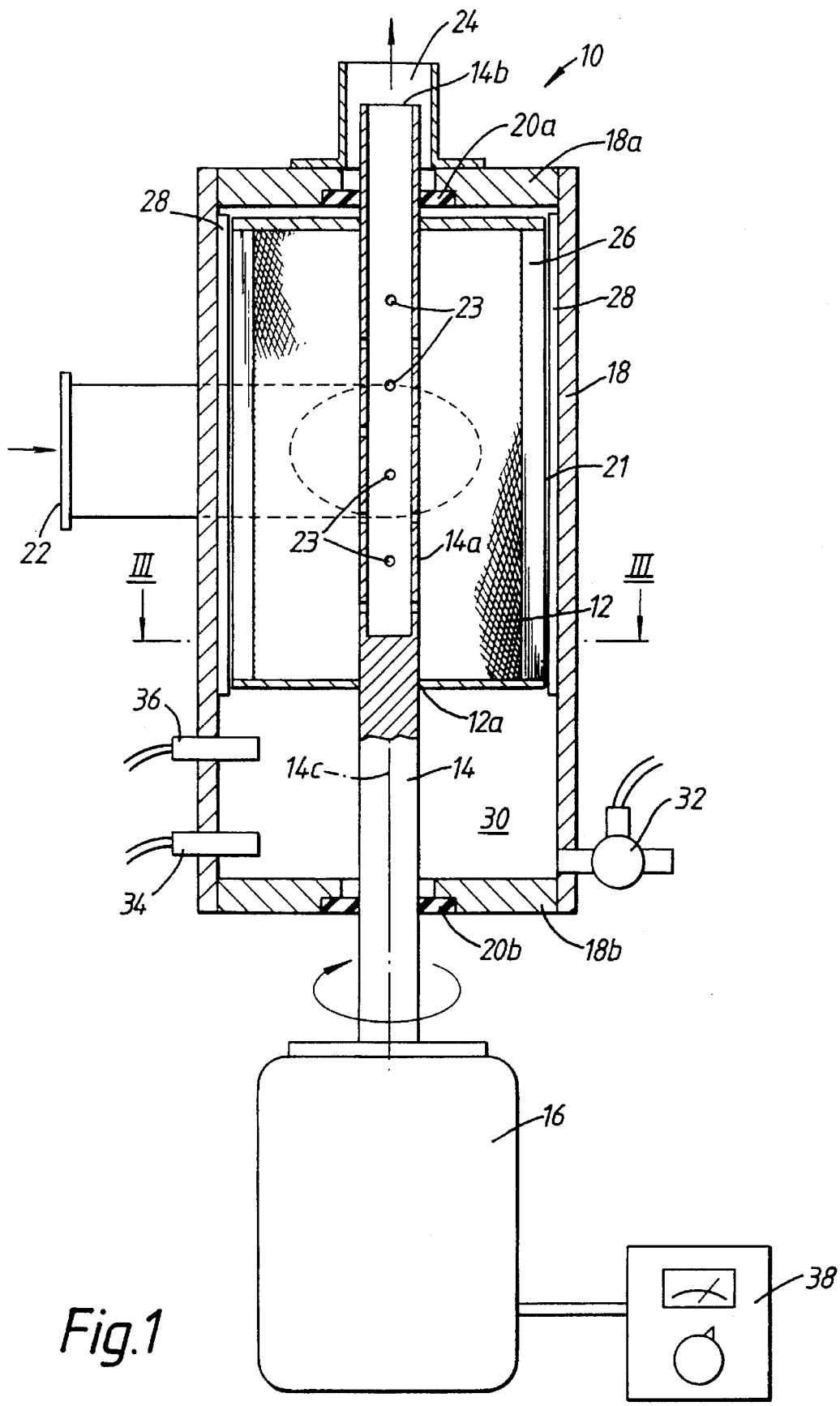
FIG. 1 is a schematic view partly in section of one embodiment of filter apparatus according to the invention.
Figure 2:
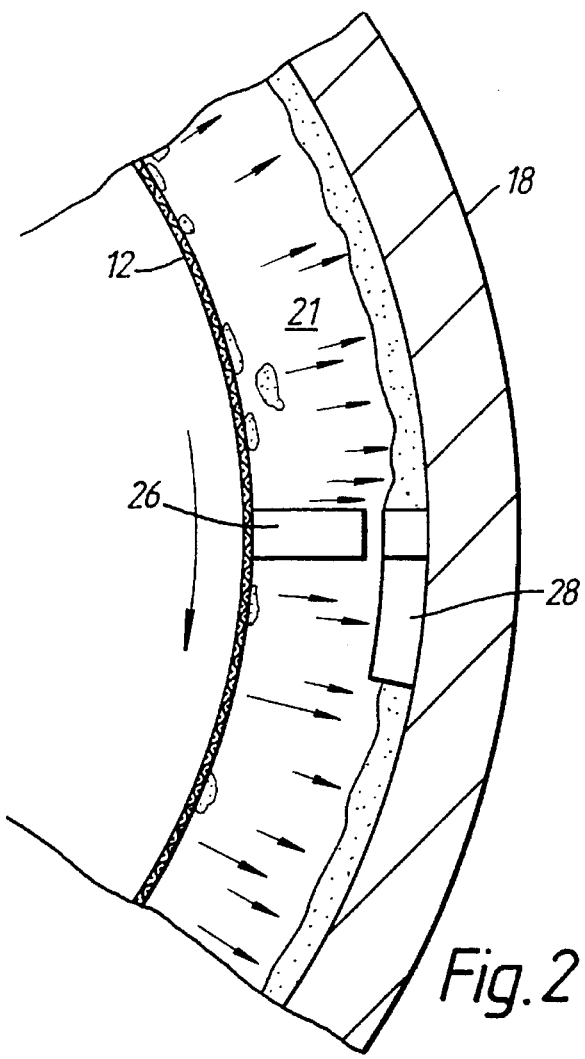
FIG. 2 is a plan view to a different scale showing part of a filter body and housing for use with the apparatus of FIG. 1.

In the drawings like parts are given like references.

In the following description it will be assumed that the liquid to be filtered is water but it will be realised that use of apparatus according to the invention is not so limited.

Referring to FIGS. 1 to 4 of the drawings, there is shown filter apparatus 10 comprising a hollow filter body 12 in the form of a right-circular cylinder having one end 12a fixedly mounted on a shaft 14 of an electric motor 16.

The filter body 12 with the shaft 14 is rotatably mounted in a cylindrical housing 18 by way of rotating seals 20a,b secured in the end walls 18a,b of the housing 18.

The exterior surface of the filter body 12 and the housing 18 respectively define an annular portion 21.

An inlet port 22 is provided in the housing 18 such that water to be filtered can be supplied under pressure to the portion 21.

A substantial length 14a of the shaft 14 which extends through the filter body 12 is formed hollow to its distal end 14b and apertures 23 in said hollow portion 14a provide a flow path for filtered water from the interior of the filter body 12 to an outlet port 24.

A plurality of elongate paddles 26 are mounted on and symmetrically about the exterior surface of the filter body 12 and arranged in spaced parallel relation with the axis 14c of the shaft 14.

Figure 3:
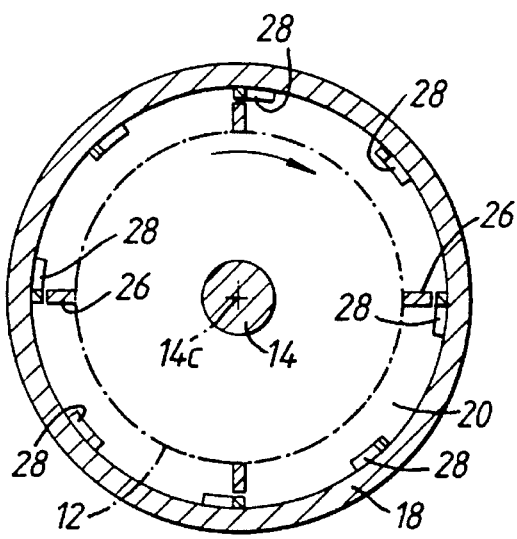
FIG. 3 is a partial plan view of the apparatus of FIG. 1 taken on line III—III.
Figure 4:
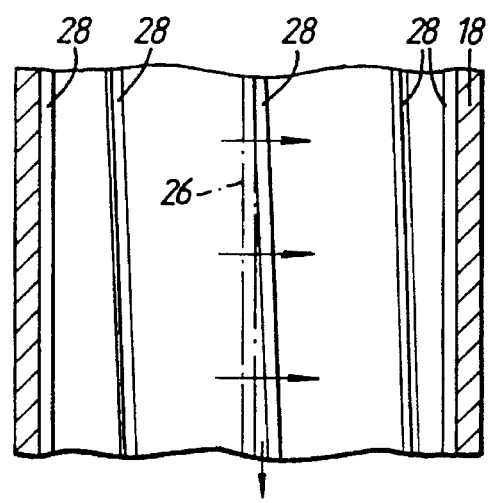
FIG. 4 is a view of part of the apparatus of FIG. 1 showing the relative orientations of members on the filter body and the housing.

A plurality of elongate ribs 28 are mounted on the interior surface of the housing 18 as best seen in FIGS. 3 and 4. Each rib 28 is arranged generally parallel to the axis 14c but at a small acute angle to the vertical for example from about 3° to 10° in the direction of rotation of the filter body 12 as shown in FIG. 4.

The cylindrical wall of the filter body 12 can be of a suitable filter material, such as a mesh, cloth, or sintered material. In the described embodiment the filter comprises a mesh of sintered material which provides a rigid body. The mesh size will be selected according to the required filtering capacity. Typically, the mesh size could be between 25 and 5 microns.

The filter apparatus can be of any suitable material such as stainless steel type 316 and will depend upon the properties of the liquid to be filtered and its contaminants.

In operation, water to be filtered is supplied under pressure, typically 6 bar, to inlet port 22 to fill the annular volume 21 and the motor 16 is energised to rotate the shaft 14 and filter body 12 at high speed, typically 2000 r.p.m–8000 r.p.m.

Rotation of the body 12 with the paddles 26 causes the water to be filtered to flow in a direction around the axis 14c so that any matter contained in the water is subjected to centrifugal forces which force it in a direction away from the filter body 12 and towards the housing 18.

The speed of rotation of the shaft 14c can be adjusted such that a substantial proportion of the matter to be filtered is directed towards the housing 18 before it reaches the filter body to reduce the likelihood of the filter material becoming clogged. Of the smaller particles which arrive at the filter body, some will pass through the filter medium into the interior and will then flow as part of the filtrate to the outlet port 24 by way of the apertures 23 and hollow tube 14a and some will tend to agglomerate to a larger mass on the exterior surface of the filter body and then be swept from the surface of the filter body due to centrifugal action and migrate towards the housing.

Thus, the filter medium tends not to clog with the result that a high throughput of water can be continuously maintained through the apparatus 10.

The elongate ribs 28 in combination with the paddles 26 also impart a downward force on the water to be filtered with the result that the filtrant particles and the like are directed downwardly so facilitating their passage to the chamber 30 below the filter body.

A valve 32 is provided in the housing whereby the filtrant sludge which builds-up in the chamber 30 can be drained-off from time to time. In this embodiment the valve 32 is electrically operated and two "sludge level" transducers 34, 36 are arranged one above the other in the chamber 30. In operation, the higher transducer 36 detects when the sludge reaches a first, upper level and provides a control signal to open to valve 32 whereupon the sludge drains away until it reaches a lower level detected by transducer 34 which provides a control signal to close the valve 32. Thus, the sludge level cycles between the upper and lower levels and does not build-up to a level where it might contaminate the filter or impede its rotation.

The motor 16 is provided with control means shown schematically at 38 which is arranged, inter alia, to control the speed of rotation of the filter body in dependence upon the quality of the water to be filtered.

If the liquid contains contaminants having a density lower than that of the liquid such that they tend to rise to the surface of the liquid, a chamber with a valve and transducer arrangement similar to the combination 30, 32, 34, 36 could be provided above the filter body 12. Alternatively, if the contaminants are primarily of lower density than the liquid, the apparatus 10 could be inverted.

If the contaminants include grease or other matter which tend to adhere to the surface of the filter body, backflushing filtrate through the apparatus 10 while the filter body is being rotated normally will tend to dislodge it and cause it to migrate towards the housing.

Figure 5:
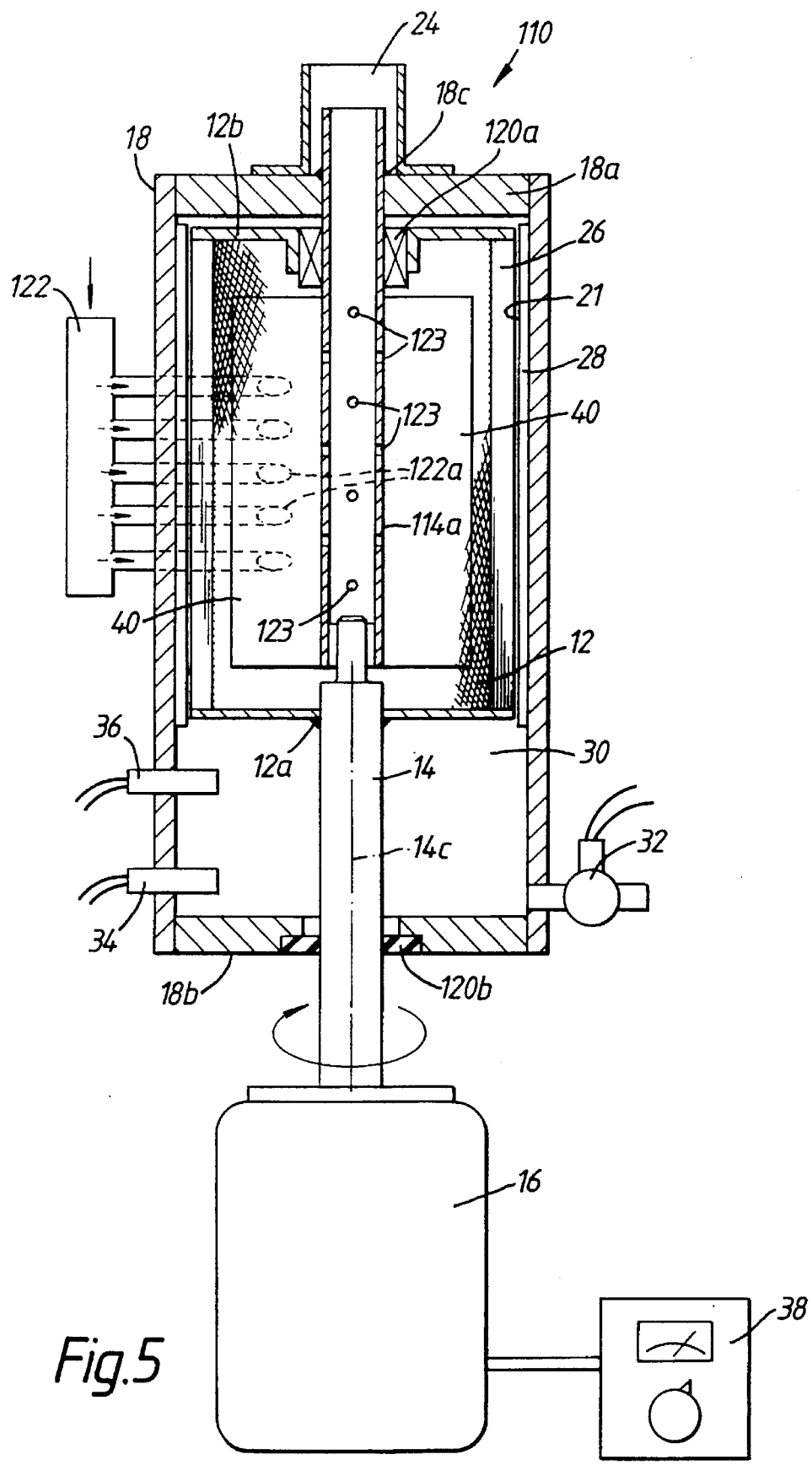
FIG. 5 is a view similar to FIG. 1 of another embodiment of filter apparatus according to the invention.

Referring now to FIG. 5 there is shown filter apparatus 110 similar in some respects to that of the apparatus 10 with various developments which can be adopted singly or in combination.

In this preferred embodiment of the filter apparatus 110 the filter body 12 is fixedly mounted on a shaft 14 of an electric motor 16. The shaft 14 is mounted for rotation in the housing 18 by way of a rotating seal 120b secured in the end wall 18b of the housing 18.

A hollow shaft 114a provided with apertures 123 is fixedly secured to the end wall 18a of the housing 18 as by welding at 18c so that it extends into the housing on a common axis 14c with the shaft 14.

The other end 12b of the filter body 12 is mounted for rotation about the hollow shaft 114a by way of a bearing 120a. The shaft 114a communicates with the outlet port 24 as described with respect to FIG. 1.

Fixedly secured to the shaft 114a is at least one radially-directed stator member 40. In the present embodiment there are four such stator members 40 arranged symmetrically about the shaft 114a. The operation of such stator members will be explained hereinafter.

The exterior and interior surfaces of the filter body 12 and the housing 18 respectively define the annular portion 21 as before.

The inlet port 122 is provided with at least one, in this case five orifices 122a of such small diameter that the water to be filtered is accelerated as it enters the housing 18 to a velocity which approaches or equals the velocity of the rotating paddles 26 which helps to reduce the load on the motor.

The elongate paddles 26 and ribs 28 function in the manner previously described.

As described in relation to the filter apparatus 10, water to be filtered in the annular space 21 is rotated by the paddles 26 towards a velocity dependent upon the speed of rotation of the filter body 12. As the water passes through the filter material into the interior of the filter body 12 it continues to rotate at this speed and thus exerts a considerable centrifugal force on the internal surface of the filter body resulting in a high hoop stress on the filter body 12 and a high load on the motor 16. When the filter body is rotating at, say 6000 r.p.m these loads can be considerable.

In the apparatus 110 the stator members 40 serve to stop or at least substantially reduce the rotational movement of the filtered water within the filter body with a consequent reduction in the loads exerted on the filter body and motor. This facilitates a reduction in the size and power of the motor and the physical construction of the filter body.

The housing 18 has been described as cylindrical but it could, for example, be so arranged that its internal wall is inclined outwardly towards its lower end 18b. It could also be coated with a low friction or non-stick material such as P.T.F.E. to facilitate easier downward movement of the accumulated sludge.

I claim:

1. Filter apparatus comprising:

a housing, a hollow filter body mounted in said housing, inlet means for supplying liquid to be filtered to the interior of said housing, filtered liquid outlet means communicating with the interior of the filter body, means for causing liquid to be filtered within said housing to flow in a direction around an axis having a substantial vertical component passing through said filter body, and means for substantially reducing the rate of flow of said filtered liquid within said filter body in said direction around said axis by way of means extending through a substantial extent of the interior of said filter body and effective to resist loads on the filtered body and means for causing.

2. Apparatus according to claim 1, wherein said means for causing liquid flow is arranged to cause at least some matter to be separated from the liquid and to be directed outwardly in a direction from said filter body towards said housing.

3. Apparatus according to claim 2, comprising means for adjusting the rate of flow of the liquid around said axis so that a substantial proportion of said matter is directed towards said housing before contacting said filter body.

4. Filter apparatus according to claim 1, wherein said filter body is mounted on a shaft rotatable about said axis, and said apparatus further includes means for rotating said filter body.

5. Apparatus according to claim 4, wherein a substantial portion of said shaft extends through said filter body and is formed hollow at its distal end to communicate with said outlet means, said shaft being provided with at least one aperture.

6. The filter apparatus according to claim 4, wherein said means for rotating said filter body is an electric motor.

7. Apparatus according to claim 1, further comprising means for removing settled material from said housing.

8. Apparatus according to claim 7, wherein said means for removing said settled material from said housing is a valve in said housing, and further comprising means for opening said valve when said material reaches a first level and means for closing said valve when the level of said material reaches a second, lower level.

9. The apparatus according to claim 1, wherein said flow means causes said liquid to flow in said housing in a circumferential direction around a space between said housing and said hollow filter body.

10. Filter apparatus comprising:

a housing, a hollow filter body mounted in said housing, inlet means for supplying liquid to be filtered to the interior of said housing, filtered liquid outlet means communicating with the interior of the filter body, means for causing liquid to be filtered within said housing to flow in a direction around an axis having a substantial vertical component passing through said filter body, wherein said means for causing liquid flow comprises paddle means on said filter body, and means for substantially reducing the rate of flow of said filtered liquid within said filter body in said direction around said axis.

11. Apparatus according to claim 10, wherein said paddle means comprises at least one elongate member on an external surface of said filter body.

12. Apparatus according to claim 11, comprising a plurality of said paddle means arranged in spaced parallel relation around said filter body and parallel to said axis.

13. Apparatus according to claim 10, comprising at least one rib member arranged on an internal wall of said housing so that said rib member in combination with said paddle means imparts a downward component of force on the liquid to be filtered.

14. Apparatus according to claim 13, comprising a plurality of said rib members arranged around said housing in spaced parallel relationship.

15. Apparatus according to claim 14, wherein said rib members are arranged at an acute angle to the vertical in the direction of rotation of the filter body.

16. Filter apparatus comprising:

a housing, a hollow filter body mounted for rotation about an axis in said housing, means for rotating said filter body, inlet means for supplying liquid to be filtered to the interior of said housing, filtered liquid outlet means communicating with the interior of the filter body, means for causing liquid to be filtered within said housing to flow in a direction around an axis having a substantial vertical component passing through said filter body, and means for substantially reducing the rate of flow of said filtered liquid within said filter body in said direction around said axis, wherein said
means for substantially reducing said rate of flow is at least one stator member mounted within said filter body.

17. Apparatus according to claim 16, wherein said at least one stator member is a planar member directed radially outwardly of said axis.

18. Apparatus according to claim 16, comprising a plurality of said stator members directed radially outwardly of said axis and arranged substantially symmetrically around said axis.

19. Apparatus according to claim 16, wherein said at least one stator member extends substantially the full internal length of the filter body.

20. The apparatus according to claim 16, wherein said means for causing liquid flow comprises at least one elongate paddle member on an external surface of said filter body.

21. The apparatus according to claim 20, comprising a plurality of said paddle members arranged in spaced parallel relation around said filter body and parallel to said axis.

22. The apparatus according to claim 20, comprising at least one rib member arranged on an internal wall of said housing so that said at least one rib member in combination with said at least one paddle member imparts a downward component of force on the liquid to be filtered.

23. The apparatus according to claim 22, wherein a plurality of said rib members are arranged around said housing in spaced parallel relationship.

24. The apparatus according to claim 16, wherein said outlet means is a shaft extending axially into said filter body, a substantial portion of said shaft extending through said filter body, said shaft being hollow at its distal end to communicate with said outlet means, said shaft being provided with at least one aperture, and said at least one stator member being coupled to said shaft.

25. The apparatus according to claim 24, wherein each of said at least one stator member is a substantially planar member extending radially outward from said outlet means within said filter body.

26. The apparatus according to claim 25, comprising a plurality of said stator members extending radially outward from said outlet means.

* * * * *

UNITED STATES PATENT AND TRADEMARK OFFICE
CERTIFICATE OF CORRECTION

PATENT NO.  : 5,565,095
DATED       : October 15, 1996
INVENTOR(S) : Malcolm R. Snowball It is certified that error appears in the above-indentified patent and that said Letters Patent is hereby corrected as shown below:

In column 4, line 58 (claim 1, line 16) delete "resist" and insert -- reduce --.

Signed and Sealed this

Fourth Day of March, 1997

*Attest:*

BRUCE LEHMAN

*Attesting Officer*   *Commissioner of Patents and Trademarks*